(12) United States Patent
Eriksson

(10) Patent No.: US 6,581,329 B1
(45) Date of Patent: Jun. 24, 2003

(54) DEVICE FOR PROMOTING GROWTH FROM SEED TO PLANT

(75) Inventor: Albert Eriksson, Kungälv (SE)

(73) Assignee: Daled AB, Kungälv (SE)

( * ) Notice: Subject to any disclaimer, the term of this patent is extended or adjusted under 35 U.S.C. 154(b) by 0 days.

(21) Appl. No.: 09/763,327

(22) PCT Filed: Sep. 16, 1998

(86) PCT No.: PCT/SE98/01652

§ 371 (c)(1),
(2), (4) Date: Mar. 27, 2001

(87) PCT Pub. No.: WO00/18215

PCT Pub. Date: Apr. 6, 2000

(51) Int. Cl.[7] .................................................. A01G 9/10
(52) U.S. Cl. .......................................................... 47/77
(58) Field of Search ............................................. 47/77

(56) References Cited

U.S. PATENT DOCUMENTS

| | | | |
|---|---|---|---|
| D194,793 S | * 3/1963 | Perl ............................... | 47/69 |
| 3,606,697 A | * 9/1971 | Eden ............................. | 219/442 |
| D242,267 S | * 11/1976 | Feeney .......................... | 47/14 |
| D356,524 S | * 3/1995 | McTavish et al. ............ | D11/155 |
| 5,419,080 A | 5/1995 | Buss et al. | |
| D409,947 S | * 5/1999 | Bongard et al. .............. | D11/155 |
| D419,483 S | * 1/2000 | McGuire ........................ | D11/145 |

FOREIGN PATENT DOCUMENTS

| | | |
|---|---|---|
| GB | 1 229 337 | 4/1971 |
| WO | 21346 | 7/1996 |

OTHER PUBLICATIONS

LBS Group, Horticultural & Amenity Supplies, 2001 Buters Guide, p. –79.*
Copy of International Search Report dated Jun. 7, 1999.
Copy of International Preliminary Examination Report dated Dec. 22, 2000.

* cited by examiner

Primary Examiner—Charles T. Jordan
Assistant Examiner—Francis T. Palo
(74) Attorney, Agent, or Firm—Burns, Doane, Swecker & Mathis, L.L.P.

(57) ABSTRACT

A seed is placed in a receptacle filled with soil to grow into a plant. The plant is transplanted when it has reached a certain size and it is then desirable to be able to relocate the plant together with a coherent lump of soil. This is difficult to achieve, but the present invention makes it possible by providing a conical lump of soil that is formed in a depression with a bottom. When the plant has grown sufficiently large so that a root system has been formed, the bottom of the depression need only be upwardly displaced for a firm conical lump of soil with a plant to be obtained, which is easy to transplant.

20 Claims, 6 Drawing Sheets

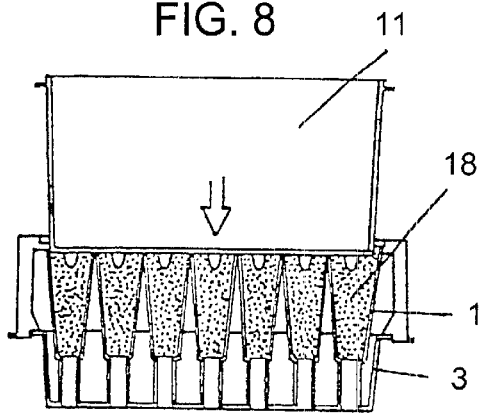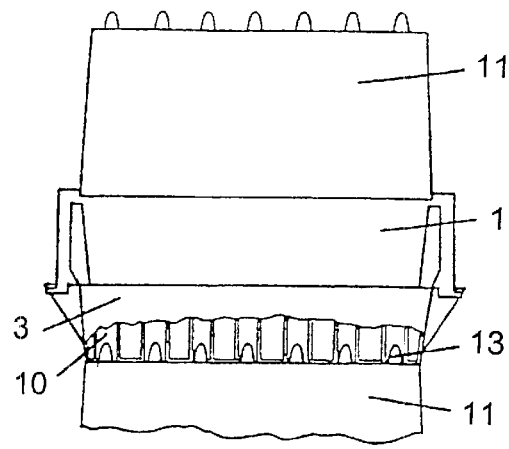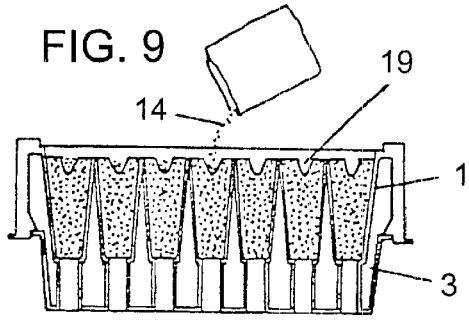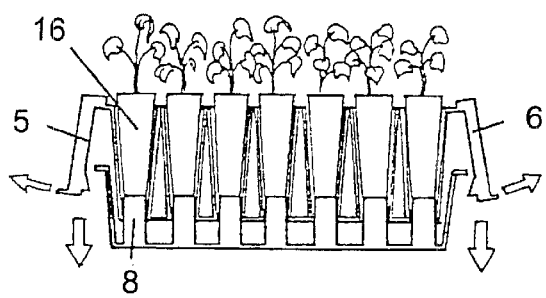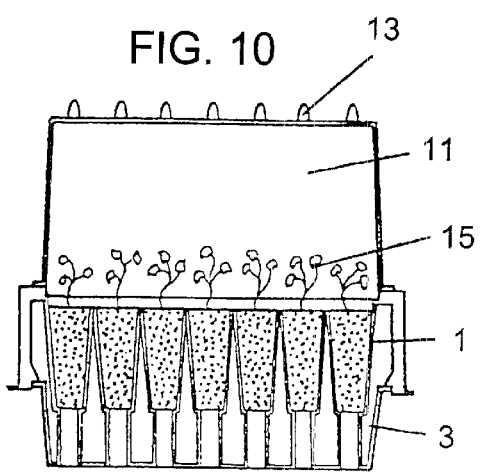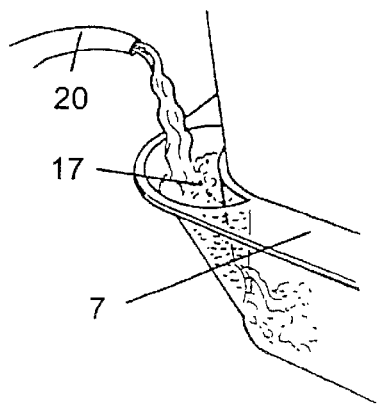

Figure 1:
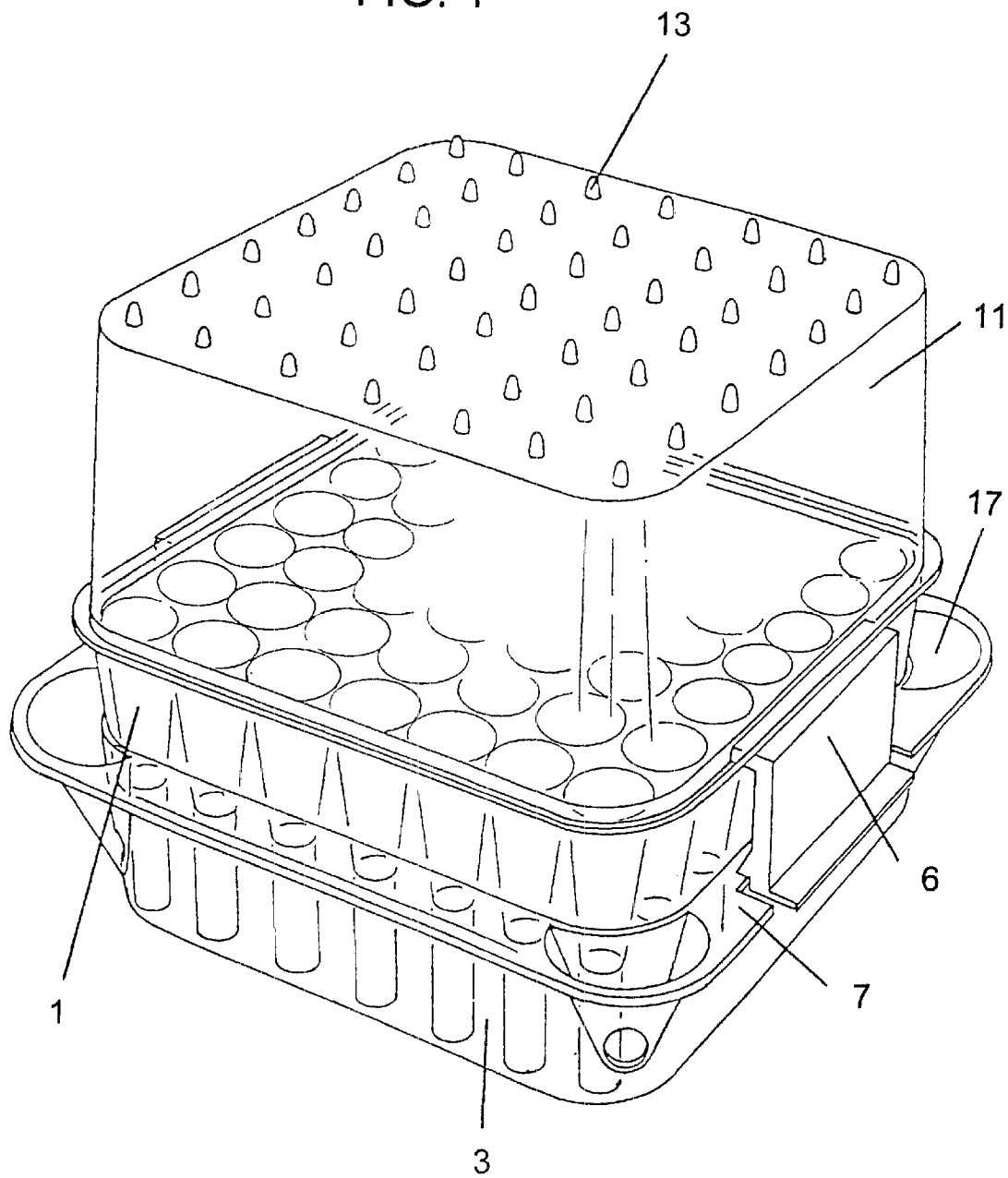

DEVICE FOR PROMOTING GROWTH FROM SEED TO PLANT

When cultivating plants, it is usual to use a receptacle, in which a seed is planted to strike root and grow into a plant. When the plant has reached sufficient size, it is transplanted to the desired location. What must be transplanted is the plant together with a lump of soil, which can be quite loose. For this reason it is cumbersome to cultivate plants in the described way.

The object of the present invention is to create a device where a seed is placed in a soil receptacle and then allowed to grow into a plant. In accordance with the invention, the procedure is to employ a cavity with any desired cross section that diminishes in size from top to bottom, which cavity is provided with a movable bottom. This cavity is filled with soil and, thereafter, a seed is added to the soil and, when the seed has rooted itself sufficiently and a sufficiently large plant has been obtained, the bottom is displaced upwards in the conical cavity. This results in a plant with a conical lump of soil that is firm being obtained, which can easily be gripped with one hand and relocated to the place where it is to be transplanted. A hood can be placed above a cavity with plant to ensure sufficient humidity for the plant and, furthermore, the unit containing the cavity can be placed in a receptacle to which water is supplied. Moist soil is thus obtained and, further, a greenhouse effect is obtained by means of the hood. The hood can then be turned and re-lifted, thereby providing aeration. In practical terms, the present invention consists of three parts, including a part termed a depression part, which comprises a number of through-running holes. This depression part co-operates with a bottom part, into which the depression part can be lowered, the bottom part having units that can form bottoms in the through-running holes. The bottom part, which is in the form of a receptacle, and the depression part are movable relative to each other. This means that, in a first position, the unit of the bottom part forms the bottom of a depression and, in another position, the unit is inserted inside a depression displacing the unit formed in the depression. The relative mobility between the depression part and the bottom part is achieved by stop means that are constructed in such a way that the two parts can assume two different positions in relation to each other. In the one instance, the unit forms the bottom and, in the other instance, the unit is inserted inside a depression.

When the two parts are united, liquid can be supplied to the bottom part so that substantial auto-irrigation is achieved.

Moreover, in accordance with the invention, a hood can be placed on top of the depression part. With the aid of the hood, a greenhouse effect is achieved above the depression part. In accordance with a favourable embodiment of the invention, the bottom part, as well as the depression part, is parallelepipedic. In connection therewith, the hood can be provided with penetration members on its topside, which penetration members are equal in number to the depressions in the depression part. When the depressions are filled with soil or another suitable substance, the hood can be turned over and the penetration members can thus create penetrations in the soil to facilitate the addition of seeds to the soil. The penetration members additionally co-operate with cavities on the underside of the base of the bottom part, so that the unit consisting of bottom part, depression part and hood can be stacked above another unit, thus facilitating the cultivation of plants when only a small space is available. Regarding the depression part, it is suitable for it to consist of a solid body provided with holes. Of course, the three parts that form part of a device for cultivating plants can have any suitable shape whatsoever. Thus, for instance, the parts can be cylindrical, have an elliptical cross section or have a triangular cross section.

Further characteristics of the present invention are disclosed in the claims set out below.

Figure 2:
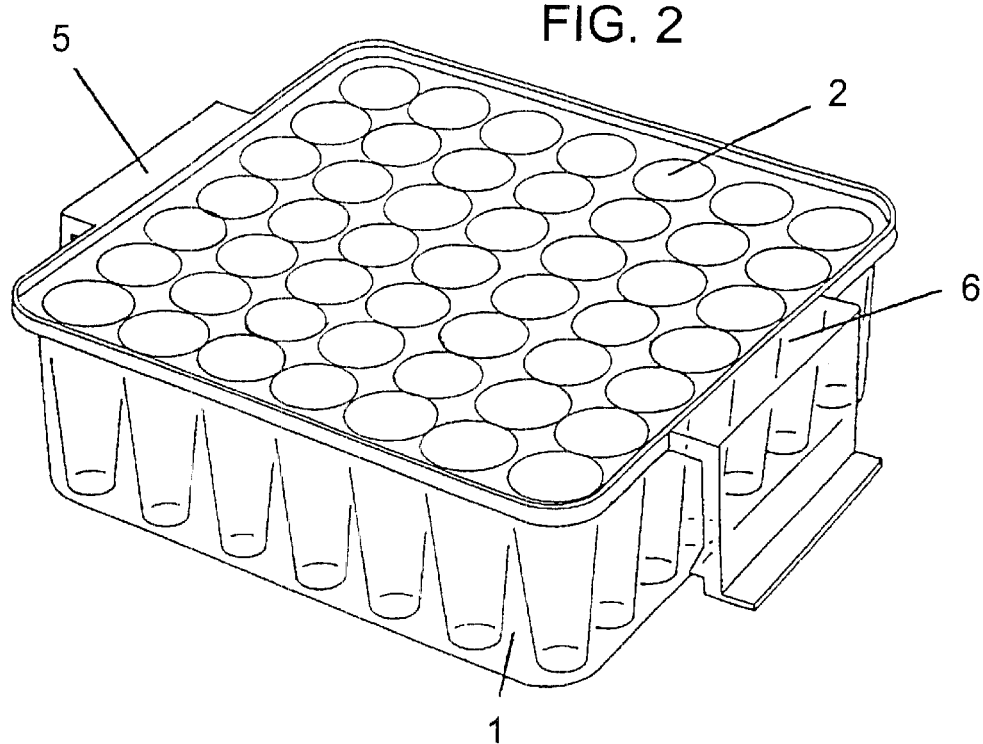
Figure 3:
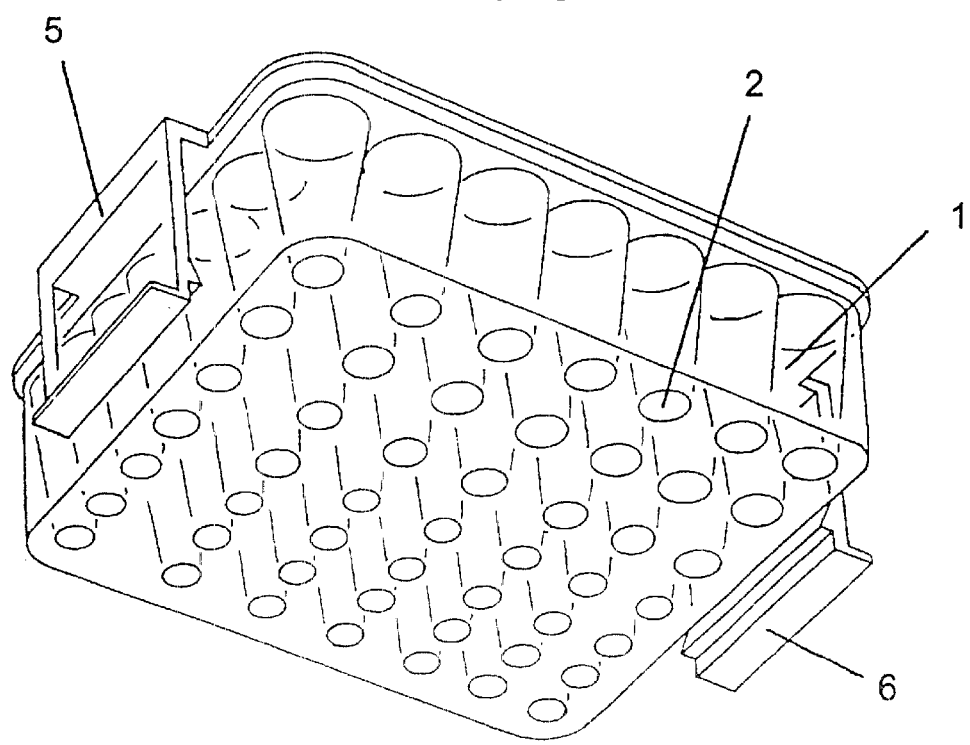
Figure 4:
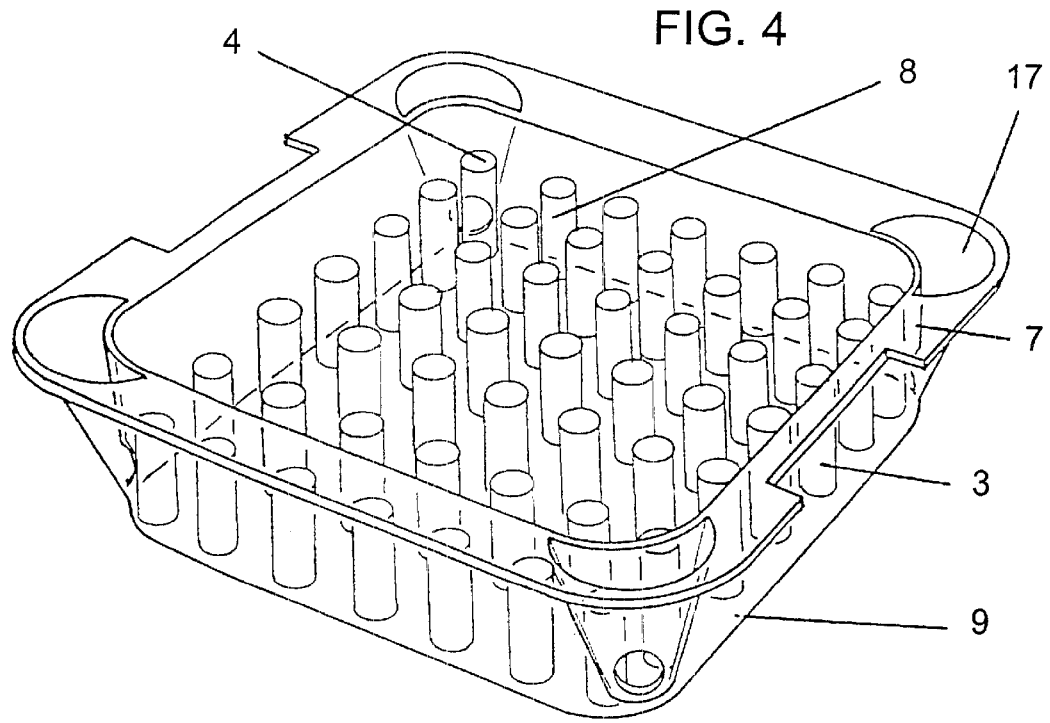
Figure 5:
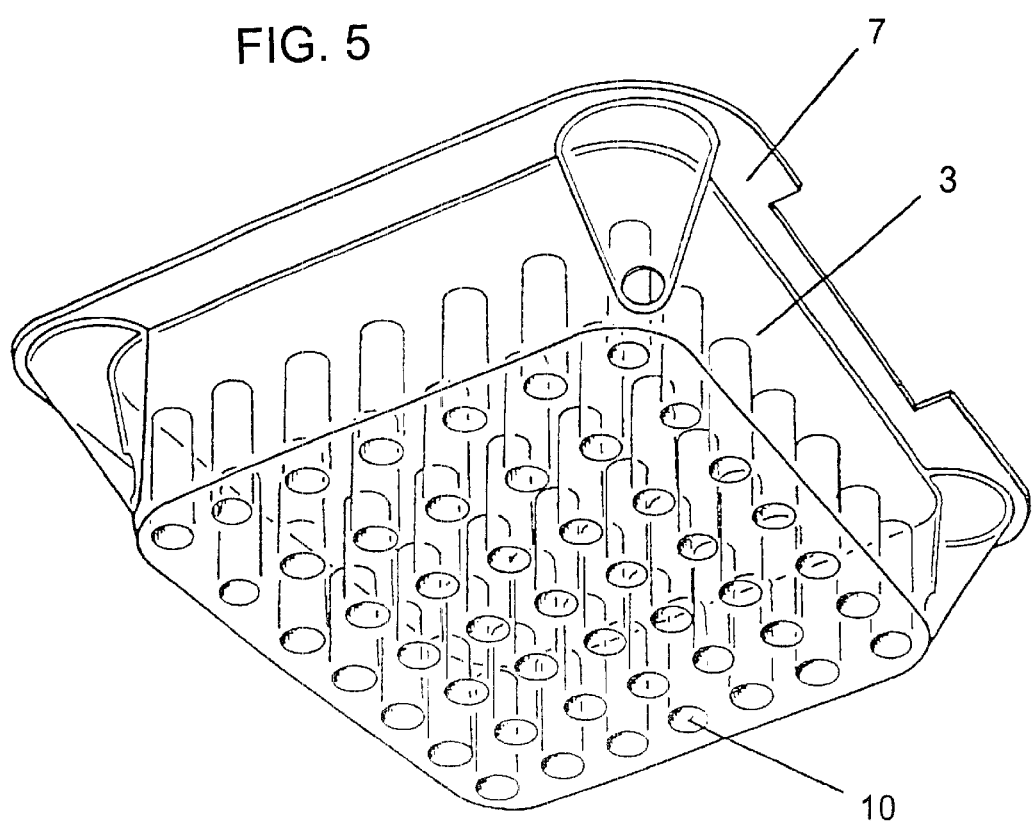
Figure 6:
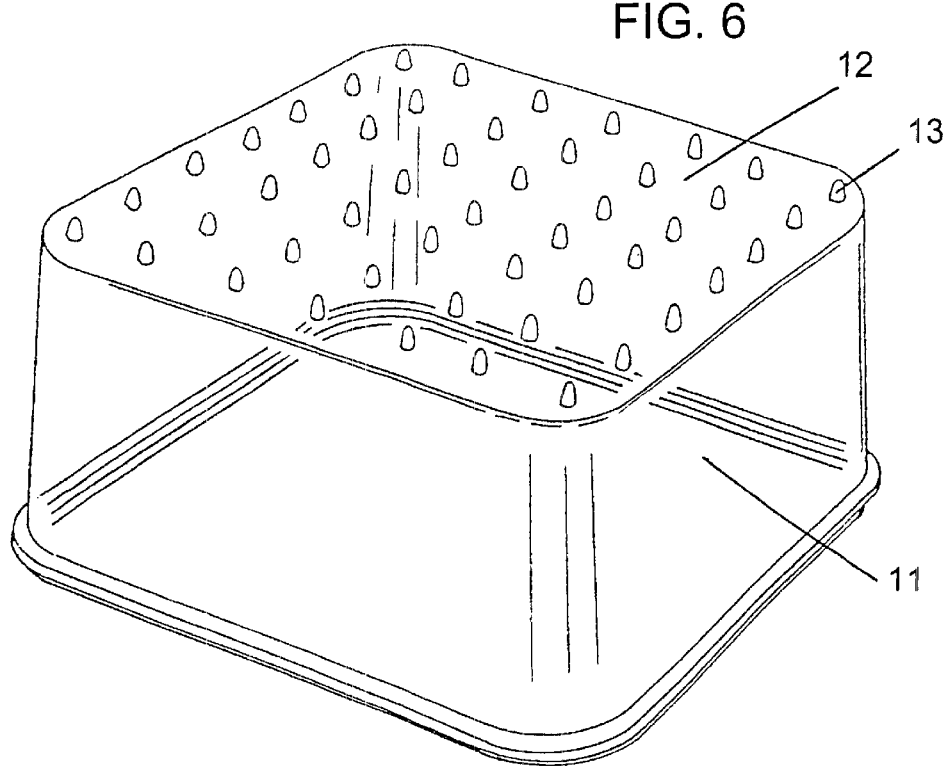
Figure 7:
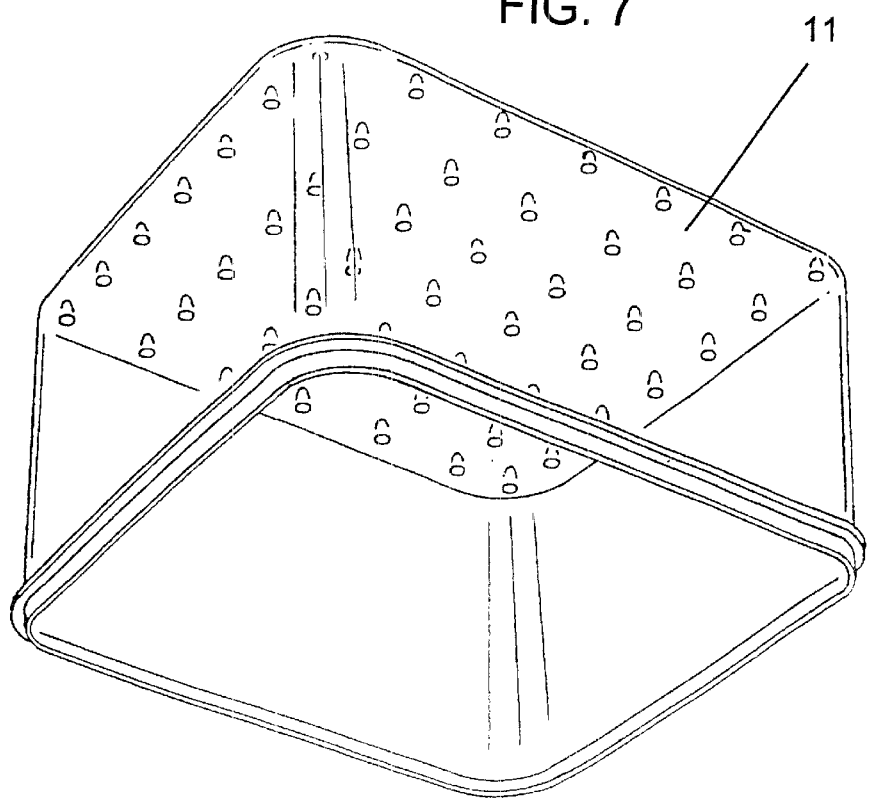
Figure 14:
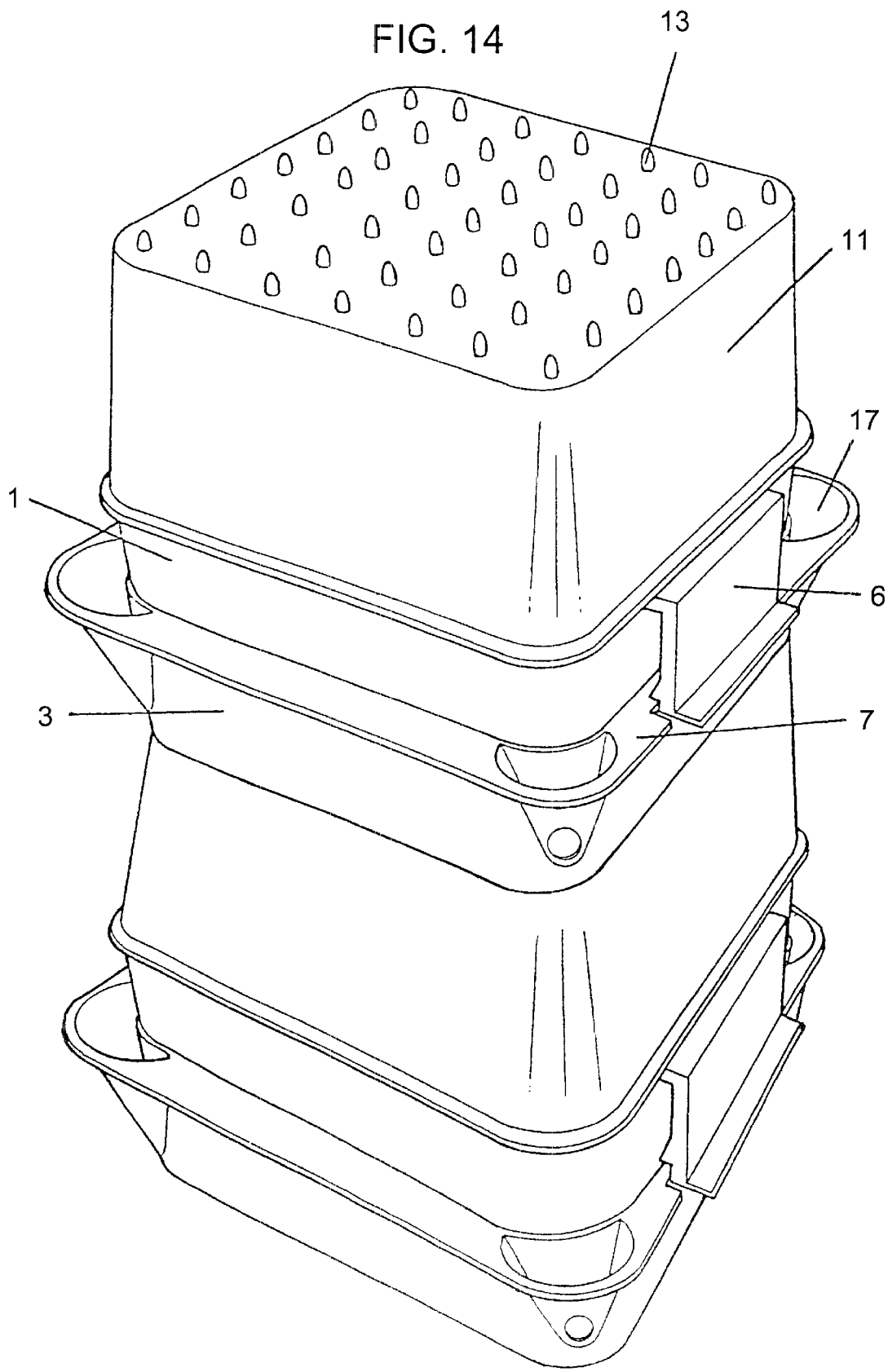

An embodiment of the present invention will be described in conjunction with the appended 6 drawings, where FIG. 1 shows the unit in accordance with the present invention consisting of a bottom part, a depression part and a hood, FIG. 2 shows the depression part seen from above, FIG. 3 shows the depression part seen from below, FIG. 4 shows the bottom part seen from above, FIG. 5 shows the bottom part seen from below, FIG. 6 shows a hood seen from above, FIG. 7 shows a hood seen from below, FIGS. 8–13 show the various steps in cultivating a transplantable plant, and FIG. 14 shows two devices in accordance with the present invention, stacked one on top of the other.

The device in accordance with the present invention consists of three parts, namely a depression part 1, a bottom part 3 and a hood 11, as clearly shown in FIGS. 1–7.

FIGS. 2 and 3 show a depression part, consisting of a solid unit made of plastic, for instance, provided with a number of conical holes 2, each with an opening at the top and an opening at the bottom. The unit 1 is on two opposite sides provided with elastic stop members 5 and 6, each of which has a horizontal part attached to the depression part 1 and a vertical part with a contact part at its base and another part that constitutes a gripping part. The depression part 1 is intended to be placed in a bottom part 3, which is in the shape of a receptacle. At its top edge, the receptacle 3 is provided with a surrounding frame 7 intended to contact the inwardly-facing contact surfaces of the stop means 5 and 6. The receptacle is provided with openings 17 communication with the interior of the receptacle so that water can be supplied to the receptacle. The receptacle has a number of rod-shaped parts 8, the top end 4 of each being intended to form the bottom of a depression 2. When the depression part 1 is deposited in the receptacle 3, the contact surfaces of the vertical part of the stop means will abut the surrounding frame 7 so that the top ends 4 of the pillar-shaped parts 8 will form the bottoms of each of the depressions 2 in the depression part 1. Cavities 10 are made beneath each pillar in the external bottom of the receptacle 3. When the depression part 1 has been placed in the receptacle 3, a hood 11 is placed above the depression part 1. The hood has four side surfaces and a topside 12 provided with penetration member 13. The penetration members 13 are equal in number to the depressions 2 in the depression part 1. This means that the hood 11 can be turned upside down. Penetrations can be made in the depressions 2 and, when this has been done, the hood 11 is placed above the depression part 1. A greenhouse effect is obtained within the hood and the hood can be turned or removed for a short period to provide ventilation. The stop means 5 and 6 are made of elastic material and, if the vertical parts of the stop means 5 and 6 are moved outwardly, the depression part will descend, which results in the rod-shaped parts 8 being inserted inside the actual depressions 2.

Regarding FIGS. 8–12, it will be evident from FIG. 8 that the depression part 1 has been filled with soil 18 and that the hood 11 has been turned upside down so that its penetration members 13 bore into the soil and achieve penetrations 19. Seeds 14 are then added to said penetrations. When this has been done, the hood 11 is turned over and, thanks to the hood, a certain greenhouse effect is then achieved above the soil surfaces in the depressions 2. Water can be supplied to the receptacle 3, as shown in FIG. 13, by way of a hose 20 through the hole 17, which means that substantial auto-irrigation is achieved. FIG. 11 shows how units in accordance with FIG. 10 can be stacked one on top of another, the penetration members 13 being inserted into the cavities 10 in the bottom of the lower part 3. When the plants have reached their desired size and are ready for transplanting, the vertical parts of the stop means 5 and 6 are influenced as shown in FIG. 12, whereupon the depression part descends and the rods 8 are inserted into the through-running holes 2, upwardly displacing a conical lump of soil 16 with a plant 15 that is easy to grip and transplant, the conical lump of soil being firmly coherent.

Thus, the present invention provides a very simple device for cultivating plants for transplanting in that each plant is grown in a conical hole with a bottom that is subsequently used to displace the conical lump of soil with the plant upwards. The cultivation and transplanting of plants cannot be effected in a simpler way.

Finally, FIG. 14 shows two units in accordance with the present invention stacked one on top of the other, illustrating that a relatively large number of units can be stacked in a small space and, furthermore, that water can be supplied to these units in a simple way so substantial auto-irrigation is achieved.

It should be obvious that the depression part, as well as the bottom part and the hood, can be made of various materials and in various designs. This means, i.a., that the depression part need not even be solid.

In certain cases, it will not be necessary to supply water to the bottom part 3 and watering will instead take place overhead and, in that case, above the depression part.

What is claimed is:

1. A device for promoting growth from a seed to a plant intended for transplanting, which device includes a depression part with several depressions, each with a cross section that diminishes in size from its opening to its bottom and form through-running holes, a bottom part co-operating with the depression part, and several units, each unit constituting the bottom of a depression and being situated on the bottom part which is movable in relation to the depression part in such a way that, in one position, the units form the bottoms of the depressions and, in another position, are inserted into the depressions, wherein the bottom part is in the shape of a receptacle, the depression part being able to rest on a top edge of the receptacle with the aid of stop means so that each unit forms the bottom of a depression and the depression part descending into the receptacle when the stop means are released so that each unit then assumes a position inside a depression.

2. A device as claimed in claim 1, wherein each unit includes a free end of a rod-shaped part extending from the bottom of the receptacle.

3. A device as claimed in claim 2, wherein the bottom of the receptacle is provided on its outside with a cavity underneath the rod-shaped part.

4. A device as claimed in claim 1, wherein the top edge of the receptacle is so designed that liquid can be supplied to the receptacle when the depression part and the receptacle co-operate with each other.

5. A device as claimed in claim 1, wherein a hood can be detachably placed on the depression part so that all depression openings are covered.

6. A device as claimed in claim 5, wherein a top side of the hood is level and provided with a number of penetration members corresponding to the number of depressions.

7. A device as claimed in claim 6, wherein the penetration members are intended to provide a penetration in each filled depression, which penetration is intended for a seed.

8. A device as claimed in claim 6, wherein the penetration members are intended to co-operate with cavities on the external side of the bottom of the receptacle to enable fixed stacking of a receptacle on top of a hood.

9. A device as claimed in claim 1, wherein the stop means includes a frame attached to the top edge of the receptacle and co-operating with elastic members attached to the depression part and intended to releasably engage the frame.

10. A device as claimed in claim 2, wherein a hood can be detachably placed on the depression part, so that all depression openings are covered.

11. A device as claimed in claim 3, wherein a hood can be detachably placed on the depression part, so that all depression openings are covered.

12. A device as claimed in claim 4, wherein a hood can be detachably placed on the depression part, so that all depression openings are covered.

13. A device as claimed in claim 7, wherein the penetration members are intended to co-operate with cavities on the external side of the bottom of the receptacle to enable fixed stacking of a receptacle on top of a hood.

14. A device as claimed in claim 2, wherein the stop means includes a frame attached to the top edge of the receptacle and co-operating with elastic members attached to the depression part and intended to releasably engage the frame.

15. A device as claimed in claim 3, wherein the stop means includes a frame attached to the top edge of the receptacle and co-operating with elastic members attached to the depression part and intended to releasably engage the frame.

16. A device as claimed in claim 4, wherein the stop means includes a frame attached to the top edge of the receptacle and co-operating with elastic members attached to the depression part and intended to releasably engage the frame.

17. A device as claimed in claim 5, wherein the stop means includes a frame attached to the top edge of the receptacle and co-operating with elastic members attached to the depression part and intended to releasably engage the frame.

18. A device as claimed in claim 10, wherein the stop means includes a frame attached to the top edge of the receptacle and co-operating with elastic members attached to the depression part and intended to releasably engage the frame.

19. A device as claimed in claim 6, wherein the stop means includes a frame attached to the top edge of the receptacle and co-operating with elastic members attached to the depression part and intended to releasably engage the frame.

20. A device as claimed in claim 7, wherein the stop means includes a frame attached to the top edge of the receptacle and co-operating with elastic members attached to the depression part and intended to releasably engage the frame.

* * * * *